(12) United States Patent
Gunjikar et al.

(10) Patent No.: US 11,740,936 B2
(45) Date of Patent: Aug. 29, 2023

(54) METHOD AND SYSTEM FOR MANAGING CLOUD RESOURCES

(71) Applicant: DIAMANTI, INC., San Jose, CA (US)

(72) Inventors: Kshitij Gunjikar, Fremont, CA (US); Sambasiva Rao Bandarupalli, Fremont, CA (US)

(73) Assignee: Diamanti, Inc., San Jose, CA (US)

( * ) Notice: Subject to any disclaimer, the term of this patent is extended or adjusted under 35 U.S.C. 154(b) by 0 days.

(21) Appl. No.: 17/526,281

(22) Filed: Nov. 15, 2021

(65) Prior Publication Data

US 2022/0156164 A1 May 19, 2022

Related U.S. Application Data

(60) Provisional application No. 63/194,611, filed on May 28, 2021, provisional application No. 63/114,295, filed on Nov. 16, 2020.

(51) Int. Cl.
*G06F 11/07* (2006.01)
*G06F 9/48* (2006.01)
(Continued)

(52) U.S. Cl.
CPC .......... *G06F 9/4881* (2013.01); *G06F 3/0614* (2013.01); *G06F 3/0631* (2013.01); *G06F 3/0653* (2013.01); *G06F 3/0665* (2013.01); *G06F 3/0673* (2013.01); *G06F 11/1484* (2013.01); *G06F 11/1662* (2013.01); *G06F 11/2028* (2013.01); *G06F 11/2041* (2013.01); *G06F 2201/815* (2013.01)

(58) Field of Classification Search
CPC ............ G06F 11/1484; G06F 11/1662; G06F 11/2028; G06F 11/2041
USPC ....................................................... 714/4.11
See application file for complete search history.

(56) References Cited

U.S. PATENT DOCUMENTS

2012/0159435 A1* 6/2012 Driesen ................... G06F 9/541
717/120
2016/0162320 A1* 6/2016 Singh ................... G06F 9/45558
718/1
(Continued)

OTHER PUBLICATIONS

"Introduction to Kubernetes (K8S)," GeeksforGeeks, last updated Jun. 5, 2020, 8 pages [retrieved online from: www.geeksforgeeks.org/introduction-to-kubernetes-k8s/].

(Continued)

*Primary Examiner* — Chae M Ko
(74) *Attorney, Agent, or Firm* — Sheridan Ross P.C.

(57) ABSTRACT

Embodiments of the disclosure provide systems and methods for enabling disaster recovery from a source cluster to a target cluster in a multi-cluster cloud-computing environment. A domain cluster configures a replicated data volume to be updated with data from a data volume of the source cluster, wherein the replicated data volume resides in the target cluster; determines that the target cluster is to replace the source cluster as an active cluster; rebuilds, in the target cluster, a new container instance to replace the container instance on the source cluster; configures the container instance to utilize the replicated data volume in the target cluster; and discontinues recognition of the data volume and container instance on the source cluster as being authoritative.

24 Claims, 7 Drawing Sheets

(51) Int. Cl.
*G06F 3/06* (2006.01)
*G06F 11/16* (2006.01)
*G06F 11/20* (2006.01)
*G06F 11/14* (2006.01)

(56) References Cited

U.S. PATENT DOCUMENTS

| | | | |
|---|---|---|---|
| 2017/0257357 A1* | 9/2017 | Wang | H04L 9/12 |
| 2017/0257432 A1* | 9/2017 | Fu | H04L 67/1014 |
| 2018/0074748 A1* | 3/2018 | Makin | G06F 9/4856 |
| 2019/0188094 A1* | 6/2019 | Ramamoorthi | G06F 11/203 |
| 2021/0103554 A1* | 4/2021 | Alluboyina | G06F 3/065 |

OTHER PUBLICATIONS

Burns et al. "Managing Kubernetes," O'Reilly Media, Inc., 2020, 26 pages [retrieved online from: www.oreilly.com/library/view/managing-kubernetes/9781492033905/ch04.html].

* cited by examiner

METHOD AND SYSTEM FOR MANAGING CLOUD RESOURCES

CROSS REFERENCE TO RELATED APPLICATION

The present application claims the benefits of U.S. Provisional Application Ser. No. 63/114,295, filed Nov. 16, 2020, entitled "Method and System for Managing Cloud Resources," and U.S. Provisional Application Ser. No. 63/194,611, filed May 28, 2021, entitled "Method and System for Storing Snapshots in Hyper-Converged Infrastructure, both of which are incorporated herein by this reference in their entirety.

FIELD

The invention relates generally to distributed processing systems and particularly to cloud computing systems.

BACKGROUND

A computer cluster is a set of computers that work together so that they can be viewed as a single system and execute in parallel to allow workloads including a high number of individual, parallelizable tasks to be distributed among the nodes in the cluster. As a result, these tasks can leverage the combined memory and processing power of each computer to increase overall performance. Cloud-based computer clusters typically provide Platform-as-a-Service (PaaS), Infrastructure-as-a-Service (IaaS), and storage, and other services to tenants. While clusters can provide high availability, load balancing, scaling, and high performance, clusters pose challenges due to their complexity caused by installing on each computer an operating system, the application, and its dependencies, particularly in cloud computing applications.

SUMMARY

The present invention can provide a number of advantages depending on the particular configuration.

In one embodiment, a method of enabling disaster recovery from a source cluster to a target cluster in a multi-cluster cloud-computing environment comprises the steps: configuring, by a domain cluster, a replicated data volume to be updated with data from a data volume of the source cluster, wherein the replicated data volume resides in the target cluster; determining, by the domain cluster, that the target cluster is to replace the source cluster as an active cluster; rebuilding, by the domain cluster and in the target cluster, a new container instance to replace the container instance on the source cluster; configuring, by the domain cluster, the container instance to utilize the replicated data volume in the target cluster; and discontinuing, by the domain cluster, recognition of the data volume and container instance on the source cluster as being authoritative.

In an embodiment, a multi-tenant, multi-cluster environment comprises a plurality of tenant clusters and a domain cluster communicatively coupled with each of the plurality of tenant clusters. The domain cluster comprises a processor and a memory coupled with and readable by the processor and storing therein a set of instructions which, when executed by the processor, causes the processor to: configure a replicated data volume to be updated with data from a data volume of the source cluster, wherein the replicated data volume resides in the target cluster; determine that the target cluster is to replace the source cluster as an active cluster; rebuild, in the target cluster, a new container instance to replace the container instance on the source cluster; configure the container instance to utilize the replicated data volume in the target cluster; and discontinue recognition of the data volume and container instance on the source cluster as being authoritative.

In an embodiment, a non-transitory, computer-readable medium comprising a set of instructions stored therein which, when executed by one or more processors, causes the one or more processors to provide access control in a multi-tenant, multi-cluster environment by: configure a replicated data volume to be updated with data from a data volume of the source cluster, wherein the replicated data volume resides in the target cluster; determine that the target cluster is to replace the source cluster as an active cluster; rebuild, in the target cluster, a new container instance to replace the container instance on the source cluster; configure the container instance to utilize the replicated data volume in the target cluster; and discontinue recognition of the data volume and container instance on the source cluster as being authoritative.

The replicated data volume can be updated with the data from the data volume of the source cluster by taking timed snapshots of the data volume of the source cluster until the target cluster is determined to replace the source cluster as the active cluster.

The configuring of the replicated data volume can include the sub-operations: creating a disaster recovery data structure defining on what volume the timed snapshots are to be asynchronously stored; determining a PersistentVolumeClaim ("PVC") used by an application on the source cluster; creating, on the target cluster, a corresponding PVC; creating, on the target cluster, a PVCGroup controller with the corresponding PVC; creating a container service matching address; and assigning a corresponding network address for the matching container service matching address to enable message routing from the source cluster to the target cluster.

The replicated data volume can be updated periodically and/or in response to new data events that occur at the data volume of the source cluster.

The container instance is commonly rebuilt in accordance with an application configuration data structure comprising a template for a container instance on the source cluster.

The domain cluster can, after discontinuing recognition of the source cluster as the active cluster, determine that the source cluster will begin acting as a backup cluster for the target cluster and configure the data volume of the backup cluster to be updated with data from the replicated data volume of the target cluster.

The domain cluster can perform a cluster level recovery process to rebuild a container instance in the target cluster and reconcile a state of the container instance with a state of another container instance in the source cluster.

The domain cluster can select a version of the replicated data volume to utilize in the target cluster, with the selected version of the replicated data volume is selected based on a completeness of data stored in the selected version of the replicated data volume.

Configuring of the replicated data volume can include the sub-operations: creating a PVCGroup controller using the PVC used by the container instance and creating a replication controller comprising the network address, whereby the disaster recovery data structure is linked to the data volume on the source cluster and the replicated data volume on the target cluster to enable the periodic snapshots to be saved to the replicated data volume.

In rebuilding the new container instance, a state of the new container instance is defined by an application configuration data structure, and snapshots in the replicated data volume. The configuring and discontinuing can comprise updating the disaster recovery data structure to designate the replicated volume in the target cluster as authoritative and the data volume in the source cluster as a new replicated volume These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means: A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also notable that the terms "comprising", "including", and "having" can be used interchangeably.

The term "application containerization" may be used to refer to an operating system-level virtualization method that deploys and runs distributed applications or virtualized applications (e.g., containerized or virtual machine-based applications) without launching an entire virtual machine for each application. Multiple isolated applications or services may run on a single host and access the same operating system kernel.

The term "automatic" and variations thereof may refer to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" may refer to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The term "cluster" may refer to a group of multiple worker nodes that deploy, run and manage containerized or Virtual Machine ("VM")-based applications and a master node that controls and monitors the worker nodes. A cluster can have an internal and/or external network address (e.g., Domain Name System ("DNS") name or Internet Protocol ("IP") address) to enable communication between containers or services and/or with other internal or external network nodes.

The term "container" may refer to a form of operating system virtualization that enables multiple applications to share an operating system by isolating processes and controlling the amount of processing resources (e.g., central processing unit ("CPU"), graphics processing unit ("GPU"), etc.), memory, and disk those processes can access. While containers like virtual machines share common underlying hardware, containers, unlike virtual machines they share an underlying, virtualized operating system kernel and do not run separate operating system instances.

The term "D10/D20 Node" may refer to a Converged Networking/Storage Server and is a platform to manage a single cluster.

The term "DCX" refers to an illustrative, but non-limiting, container platform, such as a Diamanti Container Platform.

The terms "determine", "calculate" and "compute," and variations thereof are used interchangeably and include any type of methodology, process, mathematical operation or technique.

The term "deployment" may refer to control of the creation, state and/or running of containerized or VM-based applications. It can specify how many replicas of a pod should run on the cluster. If a pod fails, the deployment may be configured to create a new pod.

The term "domain" may refer to a set of objects that define the extent of all infrastructure under management within a single context. Infrastructure may be physical or virtual, hosted on-premises or in a public cloud. Domains may be configured to be mutually exclusive, meaning there is no overlap between the infrastructure within any two domains.

The term "domain cluster" may refer to the primary management cluster. This may be the first cluster provisioned.

The term "Istio service mesh" may refer to a service mesh layer for containers that adds a sidecar container to each cluster that configures, monitors, and manages interactions between the other containers.

The term "Knative" may refer to a platform that sits on top of containers and enables developers to build a container and run it as a software service or as a serverless function. It can enable automatic transformation of source code into a clone container or functions; that is, Knative may automatically containerize code and orchestrate containers, such as by configuration and scripting (such as generating configuration files, installing dependencies, managing logging and tracing, and writing continuous integration/continuous deployment (CI/CD) scripts. Knative can perform these tasks through build (which transforms stored source code from a prior container instance into a clone container or function), serve (which runs containers as scalable services and performs configuration and service routing), and event (which enables specific events to trigger container-based services or functions).

The term "master node" may refer to the node that controls and monitors worker nodes. The master node may run a scheduler service that automates when and where containers are deployed based on developer-set deployment requirements and available computing capacity.

The term "module" may refer to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "namespace" may refer to a set of signs (names) that are used to identify and refer to objects of various kinds. In Kubernetes, for example, there are three primary namespaces: default, kube-system (used for Kubernetes components), and kube-public (used for public resources). Namespaces are intended for use in environments with many users spread across multiple teams, or projects. Namespaces may not be nested inside one another, and each Kubernetes resource may be configured to only be in one namespace. Namespaces may provide a way to divide cluster resources between multiple users (via resource quota). At a high level, the extension to namespaces enables multiple virtual clusters (or namespaces) backed by a common set of physical (Kubernetes) cluster.

The term "pods" may refer to groups of containers that share the same compute resources and the same network.

The term "project" may refer to a set of objects within a tenant that contains applications. A project may act as an authorization target and allow administrators to set policies around sets of applications to govern resource usage, cluster access, security levels, and the like. The project construct can enable authorization (e.g., Role Based Access Control or RBAC), application management, and the like within a project. In one implementation, a project is an extension of Kubernetes' use of namespaces for isolation, resource allocation and basic authorization on a cluster basis. Project may extend the namespace concept by grouping together multiple namespaces in the same cluster or across multiple clusters. Stated differently, projects can run applications on one cluster or on multiple clusters. The resources are allocated per project basis.

The term "project administrator" or "project admin" or PA may refer to the entity or entities responsible for adding members to a project, manages users to a project, manages applications that are part of a project, specifies new policies to be enforced in a project (e.g., with respect to uptime, Service Level Agreements ("SLAs"), and overall health of deployed applications), etc.

The term "project member" or PM may refer to the entity or entities responsible for deploying applications on Kubernetes in a project, responsible for uptime, SLAs, and overall health of deployed applications. The PM may not have permission to add a user to a project.

The term "project viewer" or PV may refer to the interface that enables a user to view all applications, logs, events, and other objects in a project.

The term "resource", when used with reference to Kubernetes, may refer to an endpoint in the Kubernetes Application Programming Interface ("API") that stores a collection of API objects of a certain kind; for example, the built-in pods resource contains a collection of pod objects.

The term "serverless computing" may refer to a way of deploying code that enables cloud native applications to bring up the code as needed; that is, it can scale it up or down as demand fluctuates and take the code down when not in use. In contrast, conventional applications deploy an ongoing instance of code that sits idle while waiting for requests.

The term "service" may refer to an abstraction, which defines a logical set of pods and a policy by which to access them (sometimes this pattern is called a micro-service).

The term "service provider" or SP may refer to the entity that manages the physical/virtual infrastructure in domains. In one implementation, a service provider manages an entire node inventory and tenant provisioning and management. Initially a service provider manages one domain.

The term "service provider persona" may refer to the entity responsible for hardware and tenant provisioning or management.

The term "Spektra" may refer to a Diamanti™ multi-cloud product.

The term "tenant" may refer to an organizational construct or logical grouping used to represent an explicit set of resources (e.g., physical infrastructure (e.g., CPUs, GPUs, memory, storage, network, and, cloud clusters, people, etc.) within a domain. Tenants "reside" within infrastructure managed by a service provider. By default, individual tenants do not overlap or share anything with other tenants; that is, each tenant can be data isolated, physically isolated, and runtime isolated from other tenants by defining resource scopes devoted to each tenant. Stated differently, a first tenant can have a set of resources, resource capabilities, and/or resource capacities that is different from that of a second tenant. Service providers assign worker nodes to a tenant, and the tenant admin forms the clusters from the worker nodes.

The term "tenant administrator" or "tenant admin" or TA may refer to the entity responsible for managing an infrastructure assigned to a tenant. The tenant administrator is responsible for cluster management, project provisioning, providing user access to projects, application deployment, specifying new policies to be enforced in a tenant, etc.

The term "tenant cluster" may refer to clusters of resources assigned to each tenant upon which user workloads run. The domain cluster performs lifecycle management of the tenant clusters.

The term "virtual machine" may refer to a server abstracted from underlying computer hardware so as to enable a physical server to run multiple virtual machines or a single virtual machine that spans more than one server. Each virtual machine typically runs its own operating system instance to permit isolation of each application in its own virtual machine, reducing the chance that applications running on common underlying physical hardware will impact each other.

The term "volume" may refer to a volume of memory of a selected size that is created from a distributed storage pool of memory. When a volume is created, a scheduler may automatically select an optimum node on which to create the volume. A "mirrored volume" refers to synchronous cluster-local data protection while "replicated volume" refers to asynchronous cross-cluster data protection.

The term "worker node" may refer to the compute resources and network(s) that deploy, run, and manage containerized or VM-based applications. Each worker node contains the services to manage the networking between the containers, communication with the master node, and assign resources to the containers scheduled. Each worker node can include a tool that is used to manage the containers, such as Docker, and a software agent called a Kubelet that receives and executes orders from the master node (e.g., the master API server). The Kubelet is a primary node agent which executes on each worker node inside the cluster. The Kubelet receives the pod specifications through an API server and executes the container associated with the pods and ensures that the containers described in the pods are running and healthy. If Kubelet notices any issues with the pods running on the worker nodes then it tries to restart the pod on the same node and if the issue is with the worker node itself then the master node detects the node failure and decides to recreate the pods on the other healthy node.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

Overview

In some embodiments, the present disclosure is directed to a multi-cloud global platform can provide a single plane of management console from which customers manage cloud-native applications and clusters and data using a policy-based management framework. The platform can be provided as a hosted service that is either managed centrally or deployed in customer environments. The customers could be enterprise customers or service providers. This platform can manage applications across multiple Kubernetes clusters, which could be residing on-premises or in the cloud or combinations thereof (e.g., hybrid cloud implementations). The platform can provide abstract core networking and storage services on premises and in the cloud for stateful and stateless applications.

The platform can migrate data (including volume snapshots) and applications to any desired set of resources and provide failover stateful applications on premises to the cloud or within the cloud. It can provide instant snapshots of containers or applications, mirroring or replicating of volumes, backup, and stateful or stateless application disaster recovery (DR) and data protection (DP).

Additionally, the platform can provide one or more of the following capabilities:
management of containerized or VM-based applications;
cluster management;
provision of projects to support multi-tenancy;
managed multi-cluster networking;
synchronous and asynchronous replication;
namespace-based isolation using overlay networking;
zone-aware network assignment and routing;
analytics, observability, Artificial Intelligence ("AI"/Machine Learning ("ML"), logging, and/or supportability; and/or
third party integrations.

The platform can enable organizations to deliver a high-productivity Platform-as-a-Service (PaaS) that addresses multiple infrastructure-related and operations-related tasks and issues surrounding cloud-native development. It can support many container application platforms besides or in addition to Kubernetes, such as Red Hat, OpenShift, Docker, and other Kubernetes distributions, whether hosted or on-premises.

While this disclosure is discussed with reference to the Kubernetes container platform, it is to be appreciated that the concepts disclosed herein apply to other container platforms, such as Microsoft Azure™, Amazon Web Services™ (AWS), Open Container Initiative (OCI), CoreOS, and Canonical (Ubuntu) LXD™.

The Multi-Cloud Global Platform

Figure 1:
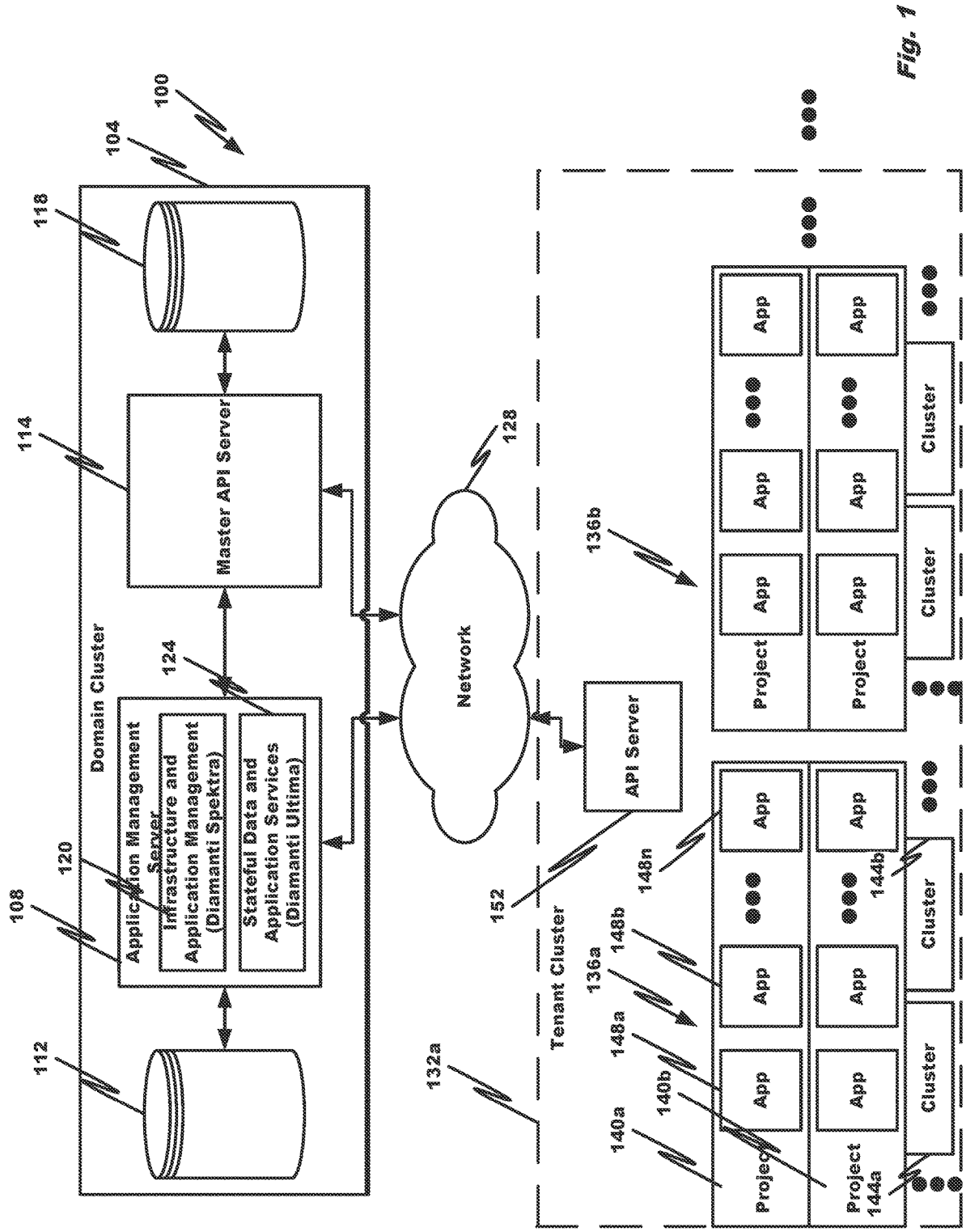
FIG. 1 is a block diagram of a cloud-based architecture according to an embodiment of this disclosure.

FIG. 1 depicts an embodiment of a multi-cloud global platform according to the present disclosure. The multi-cloud platform 100 is in communication, via network 128, with one or more tenant clusters 132a, . . . . Each tenant cluster 132a, . . . corresponds to multiple tenants 136a, b, . . . , with each of the multiple tenants 136a, b, . . . in turn corresponding to a plurality of projects 140a, b, . . . and clusters 144a, b, . . . . Each containerized or VM-based application 148a, b, . . . n in each project 140a, b, . . . utilizes the worker node resources in one or more of the clusters 144a, b, . . . .

To manage the tenant clusters 132a . . . the multi-cloud global platform 100 is associated with a domain cluster 104 and comprises an application management server 108 and associated data storage 112 and master application programming interface (API) server 114, which is part of the master node (not shown) and associated data storage 118. The application management server 108 communicates with an application programming interface (API) server 152 assigned to the tenant clusters 132a . . . to manage the associated tenant cluster 132a . . . . In some implementations, each cluster has a controller or control plane that is different from the application management server 108.

The servers 108 and 114 can be implemented as a physical (e.g., bare-metal) server or cloud server. As will be appreciated, a cloud server is a physical and/or virtual infrastructure that performs application- and information-processing storage. Cloud servers are commonly created using virtualization software to divide a physical (bare metal) server into multiple virtual servers. The cloud server can use infrastructure-as-a-service (IaaS) model to process workloads and store information.

The application management server 108 performs tenant cluster management using two management planes or levels, namely an infrastructure and application management layer 120 and stateful and application services layer 124. The stateful and application services layer 124 can abstract network and storage resources to provide global control and persistence, span on-premises and cloud resources, provide intelligent placement of workloads based on logical data locality and block storage capacity. These layers are discussed in detail in connection with FIG. 2.

The API servers 114 and 152, which effectively act as gateways to the clusters, are commonly each implemented as a Kubernetes API server that implements a RESTful API over Hypertext Transfer Protocol ("HTTP"), performs all API operations, and is responsible for storing API objects into a persistent storage backend. Because all of the API server's persistent state is stored in external storage (which is one or both of the databases 112 and 118 in the case of master API server 112) that are typically external to the API server, the server itself is typically stateless and can be replicated to handle request load and provide fault tolerance. The API servers commonly provide API management (the process by which APIs are exposed and managed by the server), request processing (the target set of functionality that processes individual API requests from a client), and provide internal control loops (provide internals responsible for background operations necessary to the successful operation of the API server).

In one implementation, the API server receives Hypertext Transfer Protocol Secure ("https") requests from Kubectl or any automation (go-client's) to send requests to any Kubernetes cluster. Users access the cluster using the API server and it stores all the API objects into etcd storage (etcd is an open source distributed key-value store used to hold and manage important information that distributed systems need to keep running). The master API server receives https requests from user interface (UI) or Distributed Configuration Management utility or dmctl. This has a single endpoint of contact for all UI functionality. It typically validates the request and sends the request to API server. An agent controller (not shown) can reside on each tenant cluster and perform actions in each cluster. Domain cluster components can use Kubernetes native or CustomResourceDefinitions (CRD) objects to communicate with the API server in the tenant cluster. The agent controller can handle the CRD objects.

In one implementation, the tenant clusters can run controllers such as Hierarchical Namespace Controller ("HNC") controller, storage agent controller, or agent controller. The communication between domain cluster components and tenant cluster are via the API server on the tenant clusters. The applications on the domain cluster can communicate with applications on tenant clusters and the applications on one tenant cluster can talk to applications on another tenant cluster to implement specific functionality.

Data storage 112 is normally configured as a database and stores data structures necessary to implement the functions of the application management server 108. For example, data storage 112 comprises objects and associated definitions corresponding to each tenant cluster, and project and references to the associated cluster definitions in data storage 118. Other objects/definitions include networks and endpoints (for data networking), volumes (created from a distributed data storage pool on demand), mirrored volumes (created to have mirrored copies on one or more other nodes), snapshots (a point-in-time image of a corresponding set of volume data), linked clones (volumes created from snapshots are called linked clones of the parent volume and share data blocks with the corresponding snapshot until the linked clone blocks are modified), namespaces, access permissions and credentials, and other service-related objects.

Namespaces enable the use of multiple virtual clusters backed by a common physical cluster. The virtual clusters are defined by namespaces. Names of resources are unique within a namespace but not across namespaces. In this manner, namespaces allow division of cluster resources between multiple uses. Namespaces are also used to manage access to application and service-related Kubernetes objects, such as pods, services, replication, controllers, deployments, and other objects that are created in namespaces.

Data storage 118 includes the data structures enabling cluster management by the master API server 114. In one implementation, data storage 118 is configured as a distributed key-value lightweight database. In Kubernetes, it is a central database for storing the current cluster state at any point of time and also used to store the configuration details such as subnets, configuration maps, etc.

The communication network 128, in some embodiments, can be any trusted or untrusted computer network, such as a WAN or LAN. The Internet is an example of the communication network 128 that constitutes an IP network consisting of many computers, computing networks, and other communication devices located all over the world. Other examples of the communication network 128 include, without limitation, an Integrated Services Digital Network (ISDN), the Public Switched Telephone Network (PSTN), a cellular network, and any other type of packet-switched or circuit-switched network known in the art. In some embodiments, the communication network 128 may be administered by a Mobile Network Operator (MNO). It should be appreciated that the communication network 128 need not be limited to any one network type, and instead may be comprised of a number of different networks and/or network types. Moreover, the communication network 128 may comprise a number of different communication media such as coaxial cable, copper cable/wire, fiber-optic cable, antennas for transmitting/receiving wireless messages, wireless access points, routers, and combinations thereof.

Figure 2:
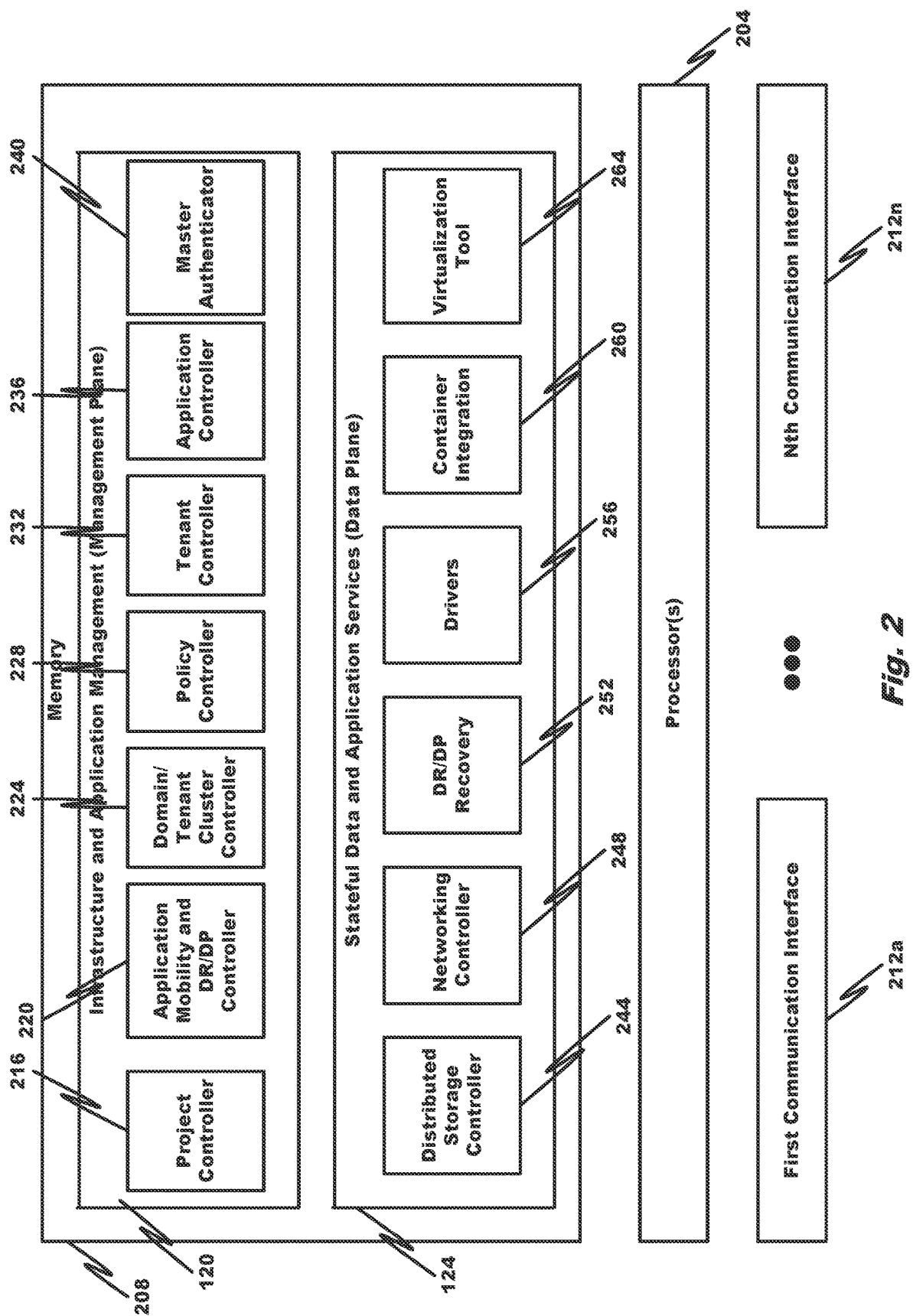
FIG. 2 is a block diagram of an embodiment of the application management server.

With reference now to FIG. 2, additional details of the application management server 108 will be described in accordance with embodiments of the present disclosure. The server 108 is shown to include processor(s) 204, memory 208, and communication interfaces 212a . . . n. These resources may enable functionality of the server 108 as will be described herein.

The processor(s) 204 can correspond to one or many computer processing devices. For instance, the processor(s) 204 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor(s) 204 may be provided as a microcontroller, microprocessor, Central Processing Unit (CPU), or plurality of microprocessors that are configured to execute the instructions sets stored in memory 208. Upon executing the instruction sets stored in memory 208, the processor(s) 204 enable various centralized management functions over the tenant clusters.

The memory 208 may include any type of computer memory device or collection of computer memory devices. The memory 208 may include volatile and/or non-volatile memory devices. Non-limiting examples of memory 208 include Random Access Memory (RAM), Read Only Memory (ROM), flash memory, Electronically-Erasable Programmable ROM (EEPROM), Dynamic RAM (DRAM), etc. The memory 208 may be configured to store the instruction sets depicted in addition to temporarily storing data for the processor(s) 204 to execute various types of routines or functions.

The communication interfaces 212a . . . n may provide the server 108 with the ability to send and receive communication packets (e.g., requests) or the like over the network 128. The communication interfaces 212a . . . n may be provided as a network interface card (NIC), a network port, drivers for the same, and the like. Communications between the components of the server 108 and other devices connected to the network 128 may all flow through the communication interfaces 212a . . . n. In some embodiments, the communication interfaces 212a . . . n may be provided in a single physical component or set of components, but may correspond to different communication channels (e.g., software-defined channels, frequency-defined channels, amplitude-defined channels, etc.) that are used to send/receive different communications to the master API server 114 or API server 152.

The illustrative instruction sets that may be stored in memory 208 include, without limitation, in the infrastructure and application management (management plane) 124 include the project controller 216, application mobility and disaster recovery controller 220, cluster controller 224, policy controller 228, tenant controller 232, application controller 236, and master authenticator 240 and, in the stateful data and application services (data plane) 124, distributed storage controller 244, networking controller 248, data protection disaster recovery/DP 252, drivers 256, container integration 260, and virtualization tool 264. Functions of the application management server 108 enabled by these various instruction sets are described below. Although not depicted, the memory 208 may include instructions that enable the processor(s) 204 to store data into and retrieve data from data storage 114 and 118.

It should be appreciated that the instruction sets depicted in FIG. 2 may be combined (partially or completely) with other instruction sets or may be further separated into additional and different instruction sets, depending upon configuration preferences for the server 108. Said another way, the particular instruction sets depicted in FIG. 2 should not be construed as limiting embodiments described herein.

In some embodiments, the instructions for the project controller 216, when executed by processor(s), may enable the server 108 to control, on a project-by-project basis, the resource utilization based on project members and control things such as authorization of resources within a project or across other projects using a network access control list (ACL) policies. The project causes grouping of resources such as memory, CPU, storage and network and quota of these resources. The project members view or consume resources based on authorization policies. The projects could be on only one cluster or span across multiple or different clusters.

In some embodiments, the instructions for the domain/tenant cluster controller 224, when executed by processor(s), may enable the server 108 to control provisioning of cloud-specific clusters and manage their native Kubernetes clusters. Other cluster operations that can be controlled include:
adopting an existing cluster;
removing the cluster from the server 108;
upgrading a cluster;
creating cluster; and
destroying the cluster.

The domain and tenant cluster controller can be an independent application developed using the operator framework.

In one implementation, the domain/tenant cluster controller 224 enables setting up of a domain cluster 104, where all the required domain cluster services such as cluster manager, configdb(etcd), auth controller, tenant, project controller, migration controller, etc., are brought up. For any newly created or existing clusters, users can choose to join an existing domain. Tenant clusters can be administered using dmctl cluster commands.

In some embodiments, the instructions for the master authenticator 240, when executed by processor(s), may enable the server 108 to implement authentication and authorization on the master API server 114. In one implementation, authentication verifies the credentials of the user and establishes the identity of the user. Authorization policies govern access rights to resources. The master authenticator 240 manages both authentication and authorization for users. The master authenticator 240 can also standardize on JavaScript Object Notation ("JSON") web tokens as a way to communicate authorization among internal server components and services. This approach can allow the verifying client to perform token verification locally without contacting the central authorization service. Local verification can be achieved using public/private key Rivest-Shamir-Adleman (RSA) mechanism or any other cryptographic algorithm.

In some embodiments, instructions for the application mobility and disaster recovery controller 220 (at the management plane) and the data protection disaster recovery/DP 252 (at the data plane), when executed by processor(s), may enable the server 108 to implement containerized or VM-based application migration from one cluster to another cluster using migration agent controllers on individual clusters. The controller 200 could include a snapshot subcontroller to take periodic snapshots and a cluster health monitoring subcontroller running at the domain cluster to monitor health of containers.

In one implementation, the application mobility and disaster recovery controller 220 effects stateless application migration by deleting the application on the source cluster and creating a new instance of the application on the destination cluster. Stateful application migration requires data migration prior to migrating application. The controller performs the following operations during the migration process:
updates ApplicationConfig object to delete the application on the source cluster;
for stateful applications, setup volume migration by creating a Migration config object and waiting for the volume migration to complete; and
updates an ApplicationConfig object to create the application on the destination cluster.

In some embodiments, instructions for the application controller 236, when executed by the processor(s), may enable the server 108 to deploy applications, effect application failover/fallback, application cloning, cluster cloning, and monitoring applications. In one implementation, the application controller 236 enables users to launch their applications from the server 108 on individual clusters or a set of clusters using a Kubectl command.

In one implementation, the application controller performs following operations:
watches for the application creation and deletion;
schedules the application to the tenant cluster based on resource requirements;

creates, updates and deletes application on the tenant cluster;

updates the status of the application; and reconciles the application on the tenant cluster.

Tenant clusters are accessed with the Kube-config stored in the domain cluster 104 as a Kubernetes secret. Each cluster's Kubeconfig is stored with the name "<cluster-name>-kubeconfig" in the tenant's namespace on the domain cluster 104. For Example: Cluster1 managed by the domain cluster 104 contains a secret with the name "cluster1-kubeconfig" in the tenant's namespace.

In some embodiments, instructions for the policy controller 228, when executed by the processor(s), may enable the server 108 to effect policy-based management, whose goal is to capture user intent via templates and enforce them declaratively for different applications, nodes, and clusters. An application may specify a policy P1 for an application. The policy controller can manage policy definitions and propagate them to individual clusters. The policy controller can interpret the policies and give the policy enforcement configuration to corresponding feature specific controllers. The policy controller could be run at the tenant cluster or at the master node based on functionality. As an example, the policy controller receives application and policy P1. To implement a snapshot policy, the policy manager can determine volumes that need snapshots and make the snapshot controller configuration, which will be propagated to the cluster hosting volumes. The snapshot controller in cluster will keep taking periodic snapshots as per the configuration requirements. In the case of a cluster health monitoring controller, the policy controller can send the configuration to that health monitoring controller on the domain cluster itself.

Other examples of policy control include application policy management (e.g., containerized or VM-based application placement, failover, migration, and dynamic resource management), storage policy management (e.g., storage policy management controls the snapshot policy, backup policy, replication policy, encryption policy, etc. for an application), network policy management, security policies, performance policies, access control lists, RBAC, and policy updates.

In some embodiments, the instructions for the distributed storage controller 244, when executed by processor(s), may enable the server 108 to perform storage configuration, management and operations such as storage migration/replication/backup/snapshots, etc.

In some embodiments, the instructions for the networking controller 248, when executed by processor(s), may enable the server 108 to enable multi-cluster or container networking (particularly at the data link and network layers) in which services or applications run mostly on one cluster and, for high availability reasons, use another cluster either on premises or on the public cloud. The service or application can migrate to other clusters upon user request or for other reasons. In most implementations, services run in one cluster at a time. The networking controller 248 can also enable services to use different clusters simultaneously and enable communication across the clusters. The networking controller 248 can attach one or more interfaces (programmed to have a specific performance configuration) to a selected container while maintaining isolation between management and data networks. This can be done by each container having the ability to request one or more interfaces on specified data networks. The networking controller 248 further enables a management network (e.g., a static subnet for each node) for containers allowing service discovery. In one implementation, the networking capabilities rely on the use of two related objects, namely networks and endpoints.

In some embodiments, the instructions for the drivers 256, when executed by processor(s), may enable the server 108 to provide a common API (via the Container Networking Interface or CNI) for connecting containers to an external network and expose (via the Container Storage Interface or CSI) arbitrary block and file storage systems to containerized or VM-based workloads.

In some embodiments, the instructions for the container integration 260, when executed by processor(s), may enable the server 108 to provide (via OpenShift) a cloud-based container platform that is both containerization software and a platform-as-a-service (PaaS).

In some embodiments, the instructions for the virtualization tool 264, when executed by processor(s), may enable the server 108 to provide virtualization functionality to containers (such as via KVM—a hypervisor for the Linux operating system).

Disaster Recovery

The disaster recovery functionality of the application mobility and DR/DP controller 220 will now be discussed with reference to FIGS. 3-6. The controller 220 can set up application policies for disaster recovery protection of stateful applications by replicating its data from a source cluster to a target cluster and controlling application failover/failback across them. It can provide one-click automated disaster recovery (failover and failback) for stateful applications. Generally, the controller 220 creates one or more replicated volumes to ensure that there is little or no loss of data if a node or drive or other resource in a cluster fails. This is done by taking timestamped snapshots, or point-in-time images, of a corresponding volume of data, and storing the snapshots in the replicated volume. A replicated volume refers to asynchronous cross-cluster data protection. In contrast, volumes within a common cluster created from snapshots are referred to as linked clones of the parent volume from which the snapshots are derived. Linked clones share data blocks with the corresponding snapshot until the linked clone blocks are modified. Linked clones can be attached to any node in a common cluster.

The disaster recovery functionality can provide numerous benefits. It can migrate applications (both stateful and stateless) from on-premises to the cloud and vice versa. It can protect applications across multiple locations with integrated application-level disaster recovery and ensure business continuity. It can monitor application migration lifecycle using various states (e.g., initializing, pending, migrating, etc.). It can move applications based on cost/data needs, i.e., if running an application on a cloud provider is proving to be expensive, it can move it to on-premises or another cloud provider. It can reduce downtime in case of cluster maintenance or upgrade. It can set recovery point objectives between bare metal on-premises and public cloud for site-to-site disaster recovery. Using the functionality can migrate applications from staging to production cluster (or development to QA to production) seamlessly through a multi-cluster configuration.

Figure 6:
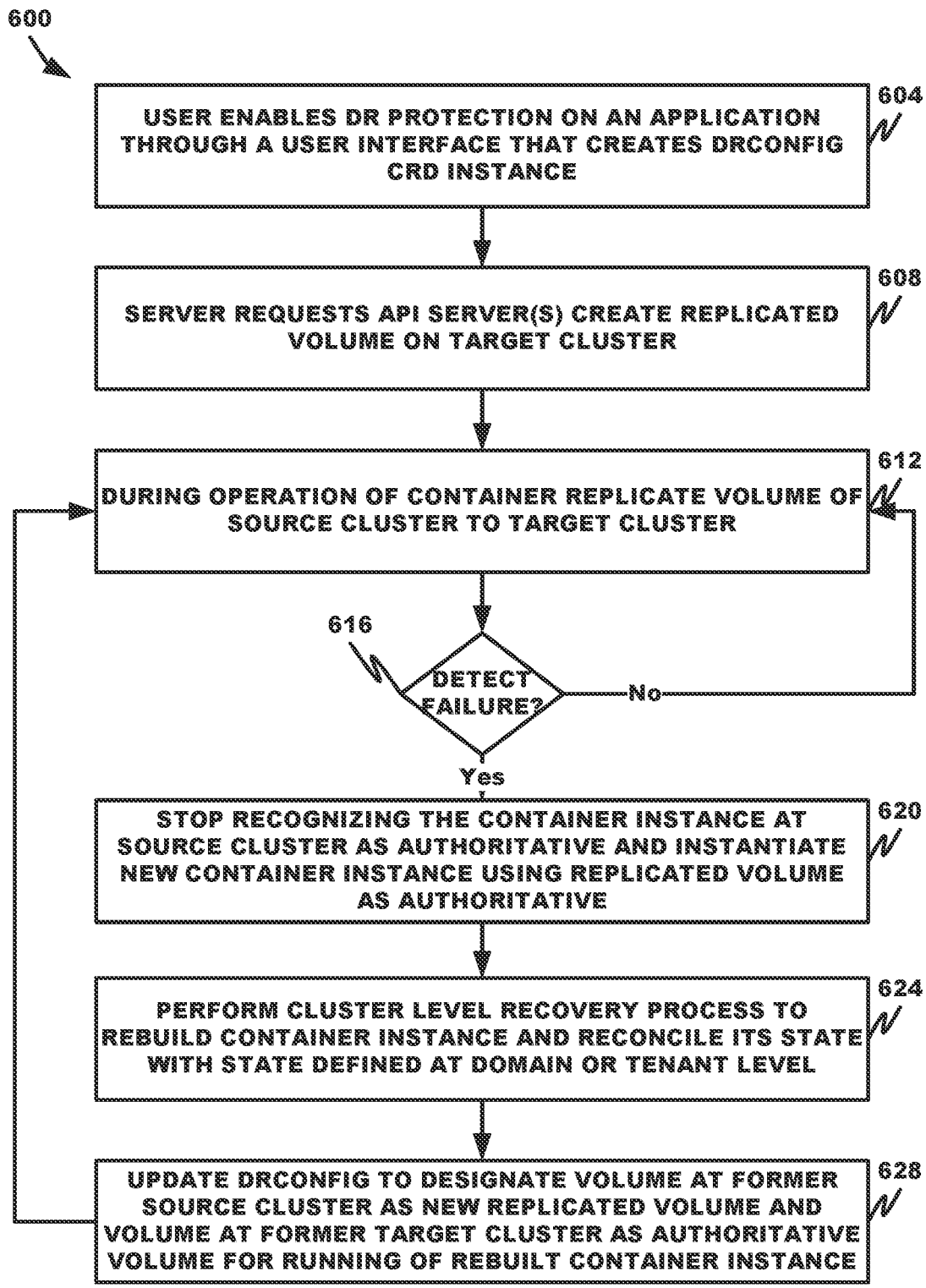
FIG. 6 is a flow chart depicting disaster recovery controller logic according to an embodiment of this disclosure.

FIG. 6 depicts a disaster recovery process 600 resulting from execution of the controller 220.

In step 604, the controller 220 receives input from a user 300 to enable disaster recovery protection on an application through a user interface that creates a disaster recovery configuration or DRConfig instance on the data plane level. DRConfig comprises a data structure that includes: the name of the application to be subject to DR, the source cluster, the target cluster, the desired network on the source cluster, the desired network on the target cluster, and the project associated with the application. Effectively, the DR Config, when applied to any application, defines where (what volume) the data is to be asynchronously stored in and at what time interval the data is to be updated. The application configuration or App Config comprises a data structure that contains the container template and includes, for example, static asset descriptions. As will be appreciated, these parameters are modeled through custom resources in the Kubernetes API.

Figure 3:
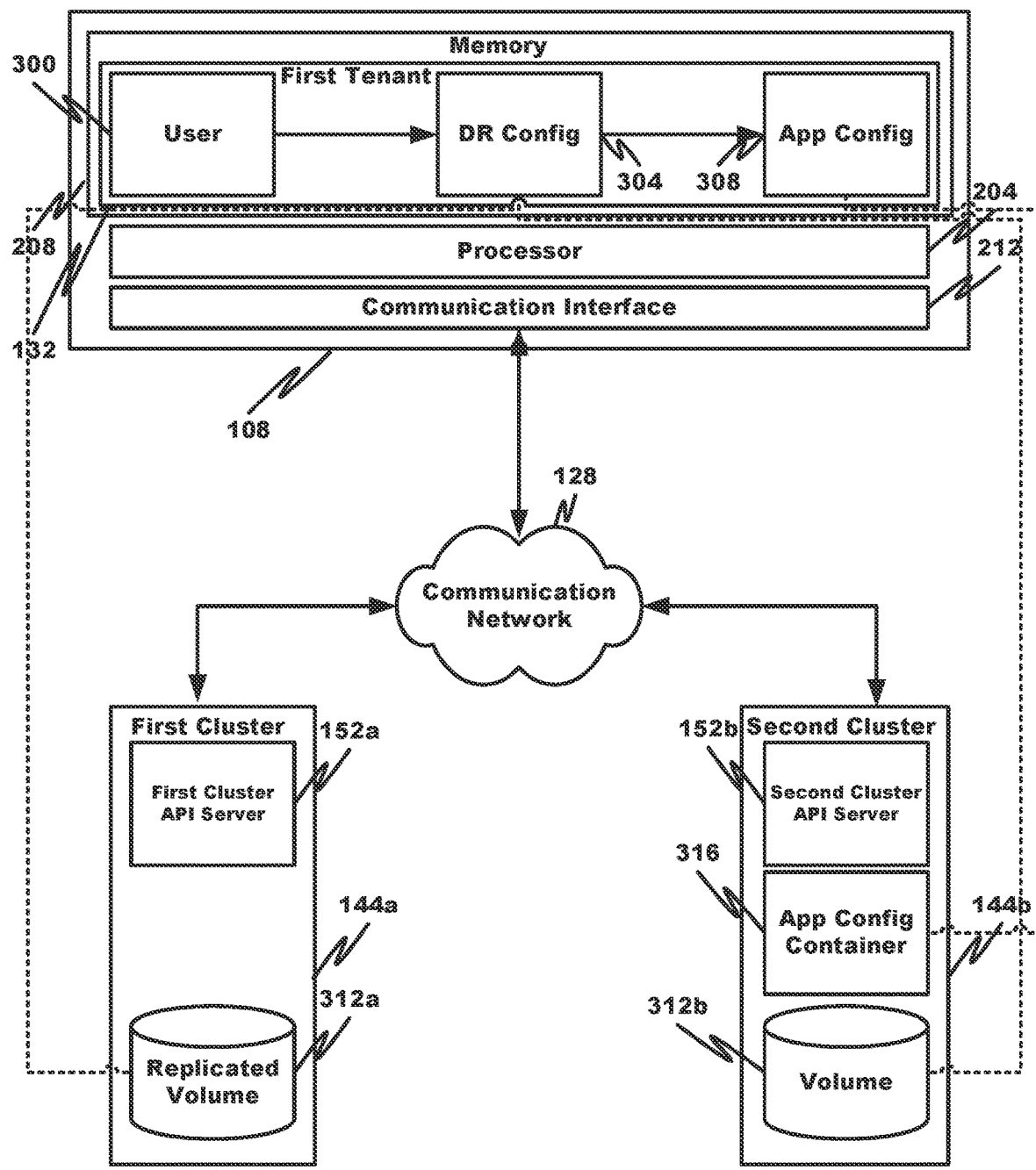
FIG. 3 is a block diagram of a cloud-based architecture according to an embodiment of this disclosure.

In step 608, the controller 220 in server 208, in response, requests the API servers 152a and 152b on the target clusters, respectively, to create a replicated volume (FIG. 3). With reference to FIG. 3, the first cluster 144a is the target cluster and the second cluster 144b is the source cluster. To enable DR protection on the application, the controller 220 typically determines the PersistentVolumeClaims (PVCs) used by the application.

A PersistentVolumeClaim (PVC) is a request for storage by a user. It is similar to a pod. Pods consume node resources and PVCs consume PersistentVolume ("PV") resources. Pods (or group of one or more containers with shared storage and network resources, and a specification for how to run the containers) can request specific levels of resources (CPU and Memory). Claims can request specific size and access modes (e.g., they can be mounted ReadWriteOnce, ReadOnlyMany or ReadWriteMany). A PersistentVolume (PV) is a piece of storage in the cluster that has been provisioned by an administrator or dynamically provisioned using storage classes (which describes the classes of storage offered and each class can map to different quality of service levels, backup policies, and other arbitrary policies determined by cluster administrators). It is a resource in the cluster just like a node is a cluster resource. PVs are volume plugins like Volumes but have a lifecycle independent of any individual Pod that uses the PV. This API object captures the details of the implementation of the storage, be that NFS, iSCSI, or a cloud-provider-specific storage system.

The controller 220 then sends the following operations to the API server 144a on the first or target cluster 144a:
1) Create corresponding PVCs (of exactly same size and same or different name);
2) Create PVCGroup Controller (CR) (with the corresponding PVCs created in step 1); and
3) Create Replication Controller (CR).

In Kubernetes, a controller is a control loop that watches the shared state of the cluster through the apiserver and makes changes attempting to move the current state towards the desired state. Examples of controllers include the replication controller, endpoints controller, namespace controller, and serviceaccounts controller.

The target or first cluster 144a would create a replication controller which includes creation of container service matching address (e.g., domain name) and assigning an IP address to it (the IP address would be routable from the source cluster to the target cluster). As will be appreciated, the replication controller in this example can be replaced with replica sets, which is a current replacement for replication controller replication.

The controller 220 then sends the following operations to the API server 144b on the second or source cluster 144a:
1) Create PVCGroup CR (using PVCs used by the application); and
2) Create Replication CR on the source cluster (which has target replication service address).

As will be appreciated, an API Group in Kubernetes is simply a collection of related functionality. Each group has one or more versions, which allow an administrator to change how an API works over time. The source cluster data service-operator would have resolved the target address) through a Delegated Machine Credentials (DMC) service-discovery service.

During the DR protection enable or create lifecycle, DRConfig, transitions through the following phases:
1. Pending: When a DR enable request is initiated, it is set to be in the Pending phase. During this phase, the controller validates the configuration and ensures the clusters are available for DR enablement.
2. Initializing_Target: Initiate PVCs, PVCGroup, Replication CR creation on target and wait for completion.
3. Initializing_Source: Initiate PVCGroup, Replication CR creation on source and wait for completion.
4. Completed: Indicates the DR protection enable completion.
5. Failed: Indicates the DR protection enable operation failed.

When the DR enable request is completed, the state of the application is shown in FIG. 3. As shown by the dotted line, the DR Config. 304 data structure is linked to each of the replicated volume 312a in the first or target cluster 144a and the authoritative volume 312b for the application in the second or source cluster 144a. During running of the application, snapshots of the volume 312b are periodically created, changed blocks are replicated, and snapshot metadata is recreated on the destination or target cluster. Depending on the frequency of snapshot generation (which is a configurable parameter), some latency will exist between the states of the volume 312b and replicated volume 312a. In addition, as shown by the dotted line the App Config 304 data structure, which defines the container for the application, is linked to the app config container 316.

With continuing reference to FIGS. 3 and 6, the controller 220 determines, in decision diamond 616, whether or not the application is running improperly, such as due to failure of a node or drive. This can be done automatically by the controller 220 or through user input received via the user interface indicating that a failure has occurred. When the application is running properly, the controller 220 returns to step 612. When the application is not running properly, the controller 220 proceeds to step 620.

In step 620, the controller 220 notifies the second cluster API server 152b to stop considering the app config container 316 and volume 312a as authoritative and the first cluster API server 152a to instantiate a new container instance in accordance with the App Config 308 data structure and using the replicated volume 312a as authoritative.

Figure 4:
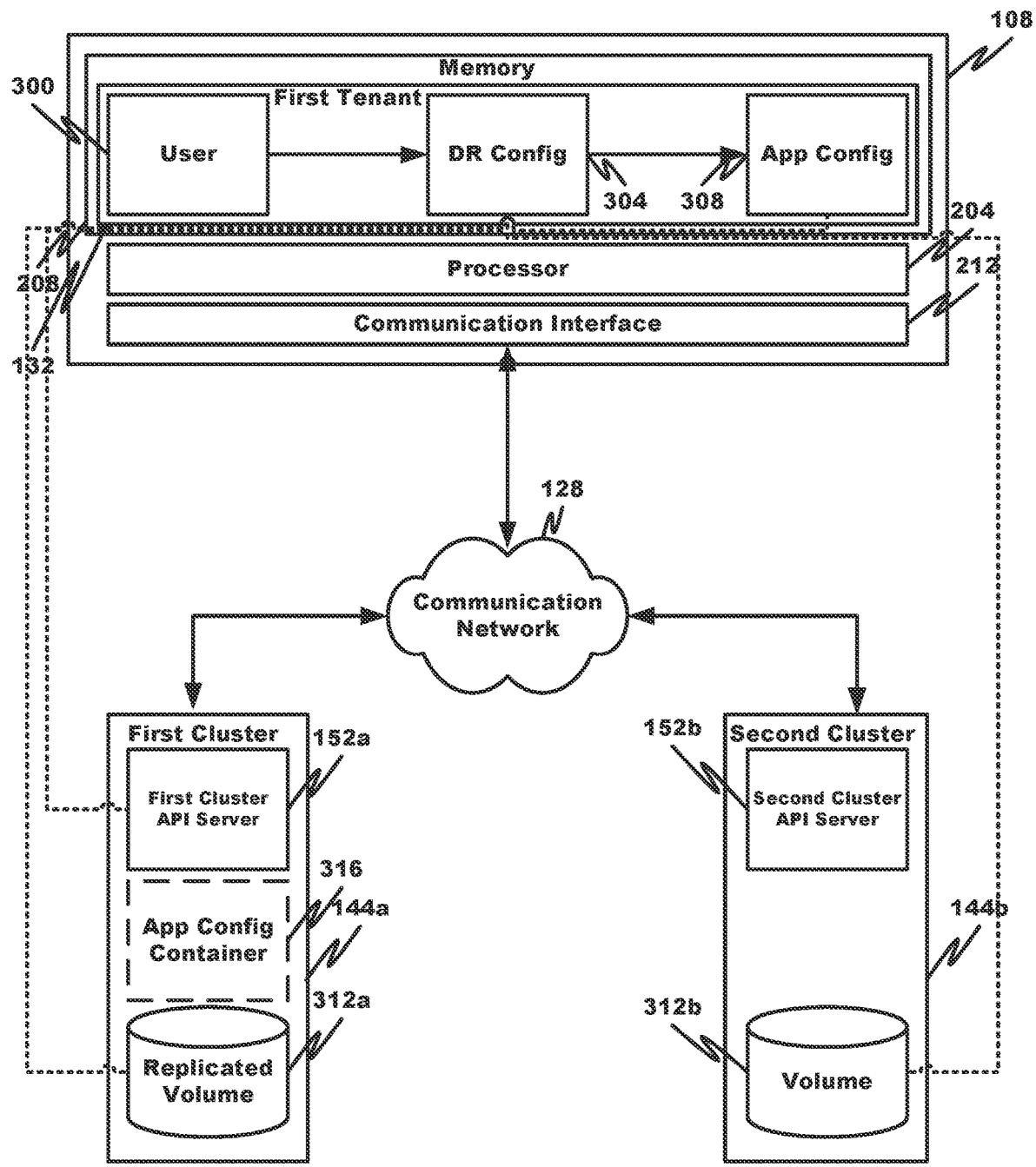
FIG. 4 is a block diagram of a cloud-based architecture according to an embodiment of this disclosure.

In step 624, the controller 220 performs a cluster level recovery process to rebuild the container instance and reconcile its state with the state defined at the domain or tenant level. The state is defined by the App Config 308 data structure and snapshots stored in the replicated volume 312a. The most recent snapshot stored in the volume is used. With reference to FIG. 4, the server 220, as shown by the changed position of the dotted line between the App Config file 308 and app config container 316 instance, has initiated creation of a new instance of the app config. container 316 in the first cluster 144a.

Figure 5:
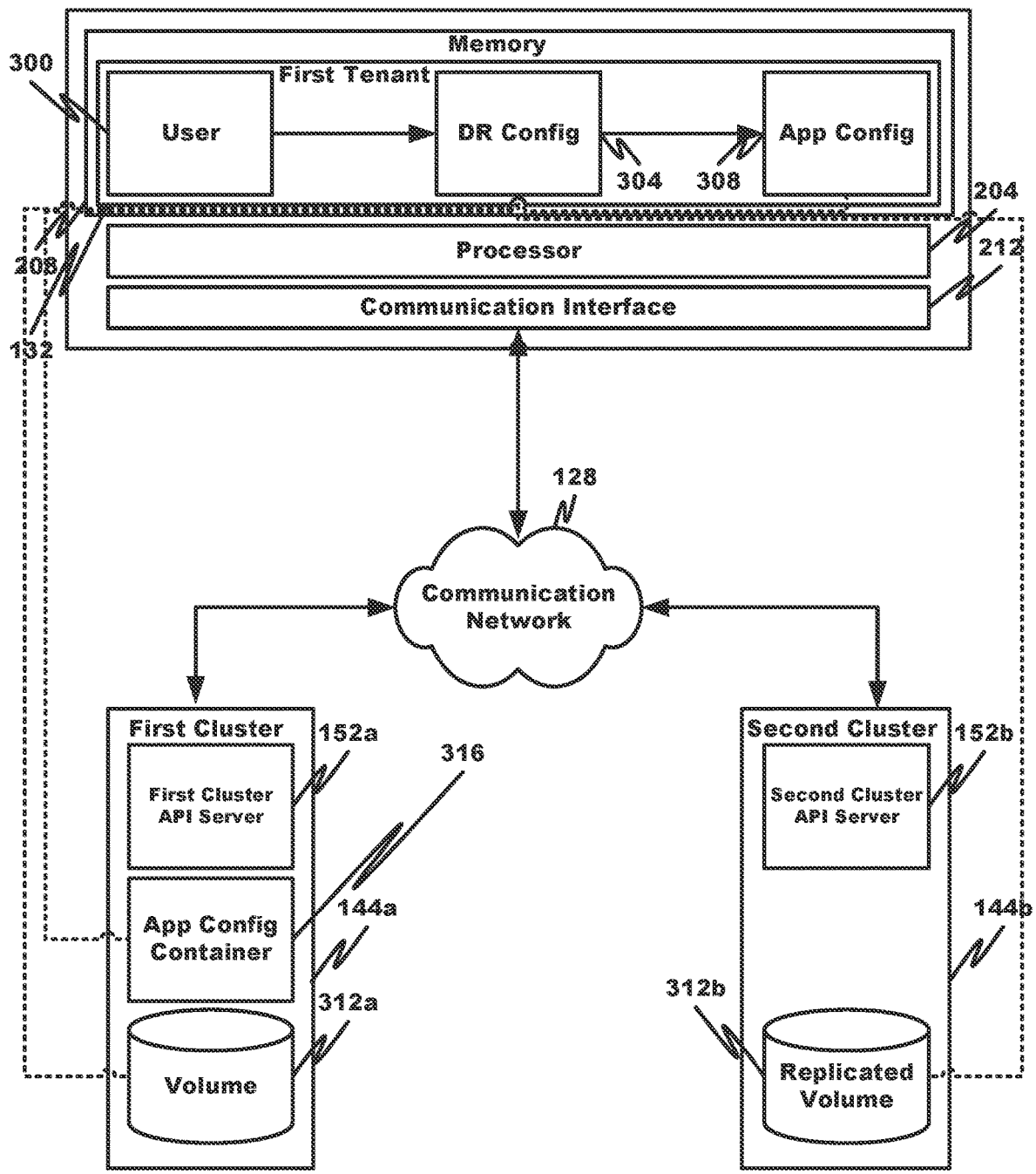
FIG. 5 is a block diagram of a cloud-based architecture according to an embodiment of this disclosure.

In step 628, the server 220 updates DR Config 304 data structure to designate the volume 312a as the parent volume and the volume 312b as the linked clone or replicated volume. The controller 220 sends the update to the first cluster server and/or second cluster server. As shown by FIG. 5, the app config container 316 instance has been successfully rebuilt on the first cluster and is storing, as linked clones, volumes generated from snapshots with the volume 312b acting as the replicated volume.

Other controller 220 DR operations include:

Disable (Remove) DR Protection (of an application), which includes the API server requests Delete Replication CR, PVCGroup CR, service address on the target cluster and Delete Replication CR, PVCGroup CR on the source cluster;

Update DR Config (of an application), which includes the API server requests: send update operation to the target and/or source clusters.

Reconcile DR Config on change in "No of PVCs" used by its application, which includes the API server requests:
1. Create/Delete corresponding PVCs on the target cluster;
2. Update PVCGroup on the target cluster (to include/exclude PVCs in/from it);
3. Send updated Replication CR to the target cluster;
4. Update PVCGroup on the source cluster (to include/exclude PVCs in/from it); and
5. Send updated Replication CR to the source cluster.

Pause/Resume DR (of an application), which includes the API server request to change Replication CR AdminState to Pause/Resume and send to the source cluster.

Reconcile DR Config on increase in "Size of PVCs" used by its application, which includes resize corresponding PVCs on the target cluster.

Authentication

Figure 7:
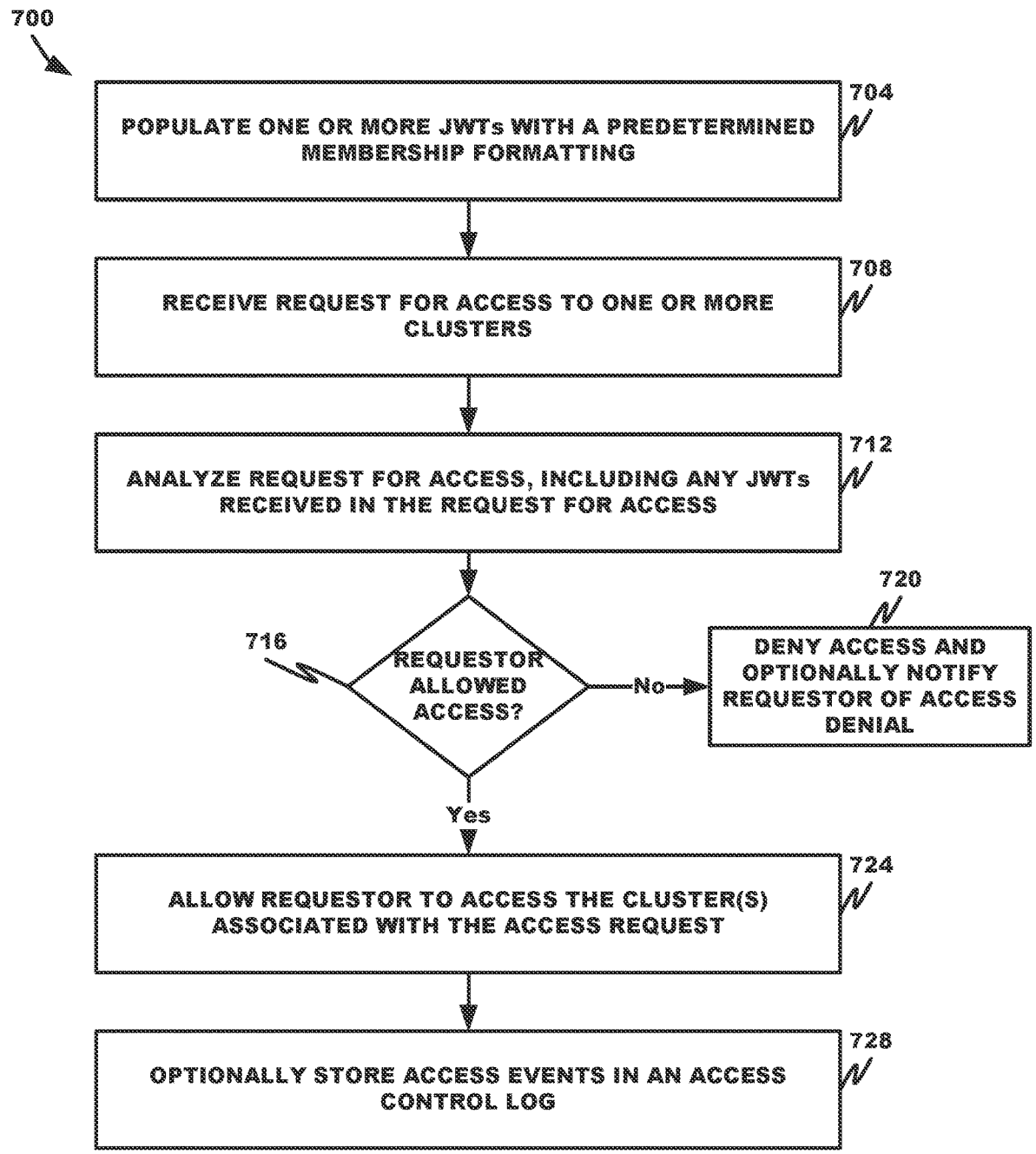
FIG. 7 is a flow chart depicting an authentication method according to an embodiment of this disclosure.

Authentication capabilities and management thereof will now be described with reference to FIG. 7. RBAC may allow access control management on kubernetes resources.

In order to link user roles to RBAC, it may be desirable to declare user designations stamped on their JSON Web identity Tokens (JWT). This can be done via formatting the membership of a user to a tenant and access level to a project within that tenancy using a hierarchical pattern such as/spektra/<tenant-name>/project/<project-name>/<role-name>.

JWTs may include a list of such strings associated with an user entity. Each of these strings then has a one-to-one correspondence with groups defined in any particular kubernetes cluster. An authentication webhook may be used to perform the duties of intercepting incoming user JWT token and populating Kubernetes roles using this scheme.

In some embodiments, an authentication method 700 may include first populating one or more JWTs with a predetermined membership formatting (step 704). The formatting may include one or more fields such as tenant-name, project-name, role-name, etc. In some embodiments, the formatting of the one or more JWTs may help control access to only a particular set of clusters or resources.

The method may continue with an access request being received at the master authenticator 240 (step 708). The master authenticator may analyze the access request, possibly including the JWT included in the access request, to determine if the request for access is received from an entity having access permissions for the cluster(s) associated with the access request (step 712).

The method 700 may continue with the master authenticator 240 determining whether or not the JWT included in the access request corresponds to a valid JWT that is allowed access to the cluster(s) associated with the access request (step 716).

In the event that the query of step 716 is answered negatively, the master authenticator 240 may return an error or access denial message to the requesting entity (step 720). In the event that the query of step 716 is answered positively, the master authenticator 240 may allow access to the cluster(s) associated with the access request (step 724). In some embodiments, the access event and any subsequent events associated with the access may be stored in an access control log, which may be maintained by the master authenticator 240 (step 728).

While access control and authentication may be performed with respect to an entity requesting access to a cluster or resources associated with a cluster, it should be appreciated that authentication may be performed at different levels of the architecture. For instance, the infrastructure and application management 120 in the application management server 108 may include one or more micro-services and some of these services are not natively aware of authentication. In order to provide authentication based access control on such services it may be desirable to provide a middleware that intercepts the HTTP request going to such services and based on the Uniform Resource Identifier ("URI") path and determine the virtual representation of the destination service by its equivalent path in Vault (the authentication agent or master authenticator 240). A simple read operation may then be performed on the virtual representation of the service in Vault and based on successful authorization, the HTTP request is forwarded downstream.

For instance, a particular user entity may only have access to project A but not project B. While data for both projects in stored in service C, user should be denied access to data for project B. So the incoming JWT ID token of the user is used to perform a read operation on an internal representation of the service at/spektra/<tenant-name>/service/<service-name>/project/<project-name>. If read operation succeeds, HTTP request is forwarded downstream. If the read operation fails, then the HTTP request is not forwarded.

The exemplary systems and methods of this invention have been described in relation to cloud computing. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of enabling disaster recovery from a source cluster to a target cluster in a multi-cluster cloud-computing environment, the method comprising:
configuring, by a domain cluster, a replicated data volume to be updated with data from a data volume of the source cluster, wherein the replicated data volume resides in the target cluster;
determining, by the domain cluster, that the target cluster is to replace the source cluster as an active cluster;
rebuilding, by the domain cluster and in the target cluster, a new container instance to replace a container instance on the source cluster;
configuring, by the domain cluster, the new container instance to utilize the replicated data volume in the target cluster; and
discontinuing, by the domain cluster, recognition of the data volume and container instance on the source cluster as being authoritative.

2. The method of claim 1, wherein the replicated data volume is updated with the data from the data volume of the source cluster by taking timed snapshots of the data volume of the source cluster until determining that the target cluster is to replace the source cluster as the active cluster and wherein the configuring of the replicated data volume comprises:
creating a disaster recovery data structure defining on what volume the timed snapshots are to be asynchronously stored;
determining a PersistentVolumeClaim ("PVC") used by an application on the source cluster;
creating, on the target cluster, a corresponding PVC;
creating, on the target cluster, a PVCGroup controller with the corresponding PVC;
creating a container service matching address; and
assigning a corresponding network address for the container service matching address to enable message routing from the source cluster to the target cluster.

3. The method of claim 1, wherein the replicated data volume is updated at least one of periodically and in response to new data events that occur at the data volume of the source cluster and wherein the new container instance is rebuilt in accordance with an application configuration data structure comprising a template for a container instance on the source cluster.

4. The method of claim 1, further comprising:
after discontinuing recognition of the source cluster as the active cluster, determining that the source cluster will begin acting as a backup cluster for the target cluster; and
configuring a data volume of the backup cluster to be updated with data from the replicated data volume of the target cluster.

5. The method of claim 1, further comprising:
performing a cluster level recovery process to rebuild a container instance in the target cluster and reconcile a state of the new container instance with a state of another container instance in the source cluster.

6. The method of claim 1, further comprising:
selecting a version of the replicated data volume to utilize in the target cluster, wherein the selected version of the replicated data volume is selected based on a completeness of data stored in the selected version of the replicated data volume.

7. The method of claim 2, wherein the configuring of the replicated data volume comprises:
creating, on the source cluster, a PVCGroup controller using the PVC used by the new container instance; and
creating a replication controller comprising the corresponding network address, whereby the disaster recovery data structure is linked to the data volume on the source cluster and the replicated data volume on the target cluster to enable the timed snapshots to be saved to the replicated data volume.

8. The method of claim 7, wherein in the rebuilding the new container instance a state of the new container instance is defined by an application configuration data structure and timed snapshots in the replicated data volume and wherein the configuring the new container instance and discontinuing comprise updating the disaster recovery data structure to designate the replicated data volume in the target cluster as authoritative and the data volume in the source cluster as a new replicated volume.

9. A multi-tenant, multi-cluster environment comprising:
a plurality of tenant clusters; and
a domain cluster communicatively coupled with each of the plurality of tenant clusters, the domain cluster comprising a processor and a memory coupled with and readable by the processor and storing therein a set of instructions which, when executed by the processor, causes the processor to:
configure a replicated data volume to be updated with data from a data volume of a source cluster, wherein the replicated data volume resides in a target cluster;
determine that the target cluster is to replace the source cluster as an active cluster;
rebuild, in the target cluster, a new container instance to replace a container instance on the source cluster;
configure the new container instance to utilize the replicated data volume in the target cluster; and
discontinue recognition of the data volume and container instance on the source cluster as being authoritative.

10. The multi-tenant, multi-cluster environment of claim 9, wherein the replicated data volume is updated with the data from the data volume of the source cluster by taking timed snapshots of the data volume of the source cluster until determining that the target cluster is to replace the source cluster as the active cluster and wherein, in the configuring the replicated data volume, the set of instructions, when executed by the processor, cause the processor to:
create a disaster recovery data structure defining on what volume the timed snapshots are to be asynchronously stored;
determine a PersistentVolumeClaim ("PVC") used by an application on the source cluster;
create, on the target cluster, a corresponding PVC;
create, on the target cluster, a PVCGroup controller with the corresponding PVC;
create a container service matching address; and
assign a corresponding network address for the container service matching address to enable message routing from the source cluster to the target cluster.

11. The multi-tenant, multi-cluster environment of claim 9, wherein the replicated data volume is updated at least one of periodically and in response to new data events that occur at the data volume of the source cluster and wherein the new container instance is rebuilt in accordance with an application configuration data structure comprising a template for a container instance on the source cluster.

12. The multi-tenant, multi-cluster environment of claim 9, wherein the set of instructions, when executed by the processor, cause the processor to:

after discontinuing recognition of the source cluster as the active cluster, determine that the source cluster will begin acting as a backup cluster for the target cluster; and configure a data volume of the backup cluster to be updated with data from the replicated data volume of the target cluster.

13. The multi-tenant, multi-cluster environment of claim 9, wherein the set of instructions, when executed by the processor, cause the processor to:

perform a cluster level recovery process to rebuild a container instance in the target cluster and reconcile a state of the new container instance with a state of another container instance in the source cluster.

14. The multi-tenant, multi-cluster environment of claim 9, wherein the set of instructions, when executed by the processor, cause the processor to:

select a version of the replicated data volume to utilize in the target cluster, wherein the selected version of the replicated data volume is selected based on a completeness of data stored in the selected version of the replicated data volume.

15. The multi-tenant, multi-cluster environment of claim 10, wherein the set of instructions, when executed by the processor, cause the processor to:

create, on the source cluster, a PVCGroup controller using the PVC used by the new container instance; and create a replication controller comprising the corresponding network address, whereby the disaster recovery data structure is linked to the data volume on the source cluster and the replicated data volume on the target cluster to enable the timed snapshots to be saved to the replicated data volume.

16. The multi-tenant, multi-cluster environment of claim 15, wherein in the rebuilding of the new container instance a state of the new container instance is defined by an application configuration data structure and timed snapshots in the replicated data volume and wherein the configuring the new container instance and discontinuing comprise updating the disaster recovery data structure to designate the replicated data volume in the target cluster as authoritative and the data volume in the source cluster as a new replicated volume.

17. A non-transitory, computer-readable medium comprising a set of instructions stored therein which, when executed by one or more processors, causes the one or more processors to provide access control in a multi-tenant, multi-cluster environment by:

configure a replicated data volume to be updated with data from a data volume of a source cluster, wherein the replicated data volume resides in a target cluster;

determine that the target cluster is to replace the source cluster as an active cluster;

rebuild, in the target cluster, a new container instance to replace a container instance on the source cluster;

configure the new container instance to utilize the replicated data volume in the target cluster; and discontinue recognition of the data volume and container instance on the source cluster as being authoritative.

18. The non-transitory, computer-readable medium of claim 17, wherein the replicated data volume is updated with the data from the data volume of the source cluster by taking timed snapshots of the data volume of the source cluster until determining that the target cluster is to replace the source cluster as the active cluster and wherein the set of instructions, when executed by the one or more processors, causes the one or more processors to:

create a disaster recovery data structure defining on what volume the timed snapshots are to be asynchronously stored;

determine a PersistentVolumeClaim ("PVC") used by an application on the source cluster;

create, on the target cluster, a corresponding PVC;

create, on the target cluster, a PVCGroup controller with the corresponding PVC;

create a container service matching address; and assign a corresponding network address for the container service matching address to enable message routing from the source cluster to the target cluster.

19. The non-transitory, computer-readable medium of claim 17, wherein the replicated data volume is updated at least one of periodically and in response to new data events that occur at the data volume of the source cluster and wherein the new container instance is rebuilt in accordance with an application configuration data structure comprising a template for a container instance on the source cluster.

20. The non-transitory, computer-readable medium of claim 17, wherein the set of instructions, when executed by the one or more processors, causes the one or more processors to:

after discontinuing recognition of the source cluster as the active cluster, determine that the source cluster will begin acting as a backup cluster for the target cluster; and configure a data volume of the backup cluster to be updated with data from the replicated data volume of the target cluster.

21. The non-transitory, computer-readable medium of claim 17, wherein the set of instructions, when executed by the one or more processors, causes the one or more processors to:

perform a cluster level recovery process to rebuild a container instance in the target cluster and reconcile a state of the new container instance with a state of another container instance in the source cluster.

22. The non-transitory, computer-readable medium of claim 17, wherein the set of instructions, when executed by the one or more processors, causes the one or more processors to:

select a version of the replicated data volume to utilize in the target cluster, wherein the selected version of the replicated data volume is selected based on a completeness of data stored in the selected version of the replicated data volume.

23. The non-transitory, computer-readable medium of claim 18, wherein the set of instructions, when executed by the one or more processors, causes the one or more processors to:

create, on the source cluster, a PVCGroup controller using the PVC used by the new container instance; and create a replication controller comprising the corresponding network address, whereby the disaster recovery data structure is linked to the data volume of the source cluster and the replicated data volume on the target cluster to enable the timed snapshots to be saved to the replicated data volume.

24. The non-transitory, computer-readable medium of claim 23, wherein in the rebuilding the new container instance a state of the new container instance is defined by an application configuration data structure and timed snapshots in the replicated data volume and wherein the configuring the new container instance and discontinuing comprise updating the disaster recovery data structure to designate the replicated data volume in the target cluster as authoritative and the data volume of the source cluster as a new replicated volume.

\* \* \* \* \*